United States Patent [19]

Gardon et al.

[11] Patent Number: 5,155,201
[45] Date of Patent: Oct. 13, 1992

[54] POLYURETHANE POLYOLS AND HIGH SOLIDS COATINGS THEREFROM

[75] Inventors: John L. Gardon, Birmingham; Scott W. Loper, West Bloomfield; Peter W. Uhlianuk, Armada; Frederick H. Walker, Birmingham, all of Mich.

[73] Assignee: Akzo N.V., Arnhem, Netherlands

[21] Appl. No.: 517,086

[22] Filed: May 1, 1990

Related U.S. Application Data

[63] Continuation-in-part of Ser. No. 379,300, Jul. 13, 1989, abandoned.

[51] Int. Cl.$^5$ .................................................. C08G 18/32
[52] U.S. Cl. ........................................ 528/78; 525/456; 528/76; 528/85; 528/264
[58] Field of Search ................ 528/73, 75, 80, 76, 528/85, 78

[56] References Cited

U.S. PATENT DOCUMENTS

| | | | |
|---|---|---|---|
| 3,248,373 | 4/1966 | Barringer | 528/65 |
| 3,626,023 | 11/1967 | Brizzy | 427/383.1 |
| 3,785,861 | 1/1974 | Tanimura et al. | 117/138.8 B |
| 4,017,556 | 4/1977 | Wang | 428/412 |
| 4,021,505 | 5/1977 | Wang | 525/509 |
| 4,268,684 | 5/1981 | Gurgiolo | 560/24 |
| 4,284,750 | 8/1981 | Amirsakis | 529/79 |
| 4,288,577 | 9/1981 | McShane, Jr. | 525/453 |
| 4,289,813 | 9/1981 | Blomeyer et al. | 427/395.5 |
| 4,410,667 | 10/1983 | Porter, Jr. et al. | 525/440 |
| 4,444,188 | 11/1985 | Holubka et al. | 427/393.5 |
| 4,451,622 | 5/1984 | DiDomenico, Jr. | 525/456 |
| 4,484,994 | 11/1984 | Jacobs, III et al. | 204/181 |
| 4,485,228 | 11/1984 | Chang et al. | 528/84 |
| 4,520,167 | 5/1985 | Blank et al. | 525/131 |
| 4,524,192 | 6/1985 | Alexander et al. | 525/440 |
| 4,530,976 | 7/1985 | Kordomenos et al. | 525/440 |
| 4,533,703 | 8/1985 | Korddomenos et al. | 525/440 |
| 4,540,766 | 9/1985 | Chang et al. | 528/45 |
| 4,540,771 | 9/1985 | Ambrose et al. | 523/272 |
| 4,543,405 | 9/1985 | Ambrose et al. | 528/73 |
| 4,548,998 | 11/1985 | Chang et al. | 525/441 |
| 4,554,188 | 11/1985 | Holubka et al. | 560/25 |
| 4,555,704 | 8/1985 | Alexander et al. | 525/440 |
| 4,559,383 | 12/1985 | Holubka et al. | 560/25 |
| 4,587,323 | 5/1986 | Toman | 560/158 |
| 4,605,724 | 8/1986 | Ambrose et al. | 528/73 |
| 4,631,320 | 12/1986 | Parekh et al. | 525/452 |
| 4,789,718 | 6/1988 | Noll et al. | 528/49 |

FOREIGN PATENT DOCUMENTS

| | | |
|---|---|---|
| 843069709 | 5/1985 | European Pat. Off. . |
| 873068662 | 3/1988 | European Pat. Off. . |
| 2611782 | 3/1975 | Fed. Rep. of Germany . |
| 144432 | 12/1976 | Japan . |
| 59-006209 | 2/1982 | Japan . |
| 63-089574 | 1/1986 | Japan . |

OTHER PUBLICATIONS

"Modern Surface Coatings" by Paul. Nylen & Edward Sunderland 1965 Interscience Publishers, pp. 604-705.

*Primary Examiner*—John Kight, III
*Assistant Examiner*—Shelley A. Wright
*Attorney, Agent, or Firm*—James K. Poole; Louis A. Morris; Bart B. Lerman

[57] ABSTRACT

A polyurethane polyol is provided, which is the reaction product of a particular isocyanate component and a particular diol component in a specified ratio, which polyol component is selected from substantially monomeric diols wherein the hydroxyl groups are separated by 3 carbon atoms or less. Such polyurethane polyols possess a desirable spectrum of molecular weight properties, making them especially suitable for use in formulating high solids, high performance coatings.

59 Claims, No Drawings

POLYURETHANE POLYOLS AND HIGH SOLIDS COATINGS THEREFROM

This application is a continuation-in-part of U.S. application Ser. No. 07/379,300, filed Jul. 13, 1989, now abandoned.

BACKGROUND OF THE INVENTION

The present invention relates generally to a particular class of low molecular weight, relatively monodisperse polyurethane polyols which are suitable for use in high performance, high solids coatings.

Many of the high performance, high solids automotive coatings presently in use are based upon polymeric systems comprised of either polyester-based or polyacrylic-based polyols and crosslinking agents therefor. These coatings are generally supplied as "one-pack" or "two-pack" systems.

In a typical one-pack system, all of the coating ingredients are combined into one storage stable mixture. Upon application the polyol component is crosslinked, generally with an aminoplast resin (such as a melamine resin) or a blocked isocyanate, under heat cure conditions of 120° C. or above. In a typical two-pack system, the polyol component is combined with a crosslinking agent, generally an isocyanate, shortly before application, with curing being conducted at ambient or elevated temperatures.

For environmental reasons, it is becoming increasingly important to develop polymeric systems with low solution viscosities, which permit the formulation of high solids coatings with low application viscosities suitable for spraying. High solids coatings (generally about 50 wt % or greater solids) significantly decrease the amount of volatile organic compounds (VOC) entering the atmosphere upon drying/curing of the coating.

To achieve acceptable solution viscosities (20–30 seconds. #4 Ford Cup at 20° C.) for typical high solids coating systems, the polyols should possess a weight average molecular weight (Mw) of about 5000 or lower. In general, the lower the Mw the lower the solution viscosity.

To achieve good film properties it is important that, upon film formation, the polyol molecules become sufficiently chemically bonded to each other. This can be accomplished by providing each polyol molecule with at least two reactive hydroxyl groups. A very low hydroxyl equivalent weight (HEW) (e.g., below about 200), however, may lead to brittle films. It has been found that, in general, the best spectrum of film properties may be obtained for HEWs between about 300 to 500. It follows, therefore, that for good film formation the polyols should possess a number average molecular weight (Mn) of at least about 800.

As is evident from the above discussion, the requirements for acceptable solution viscosities and good film properties lead to contradictory molecular weight requirements—for low solution viscosities the Mw should be low, but for good film properties the Mn should be high.

In acrylic free radical polymerization and in polycondensation leading to polyesters, it is difficult to achieve sufficiently narrow molecular weight distributions. In other words, it is difficult to formulate high solids, high performance coating systems from acrylic and/or polyester based polyols which possess both acceptable application viscosities and resulting film properties.

A considerable amount of work in this area has recently been done relating to high solids, high performance coatings which are based, in part, upon relatively low molecular weight polyesterurethane, urethane-modified polyester and polyurethane polyols.

For example, U.S. Pat. Nos. 4,485,228 and 4,540,766 describe high solids coating systems based, in part, upon relatively low molecular weight polyesterurethane polyols and crosslinking agents therefor. More particularly, U.S. Pat. No. 4,485,228 describes a two-pack system with a polyisocyanate crosslinker, while U.S. Pat. No. 4,540,766 describes a one-pack system with an aminoplast or blocked isocyanate crosslinker. The polyesterurethane polyols of these references are produced via the reaction of a polyisocyanate with a stoichiometric excess of a polyester polyol.

In related U.S. Pat. Nos. 4,540,771 and 4,605,724, the polyester polyols utilized for the polyurethane polyols are produced by reacting a polycarboxylic acid or lactone with a large excess of a low molecular weight polyol wherein, after completion of the reaction, the excess polyol is removed, e.g., by distillation.

U.S. Pat. No. 4,548,998, like those references just mentioned, describes a high solids coating system based upon a polyesterurethane polyol, except that the polyesterurethane polyol is produced by isocyanate-free reaction of a polyester polyol, urea and a polyamine.

U.S. Pat. Nos. 4,524,192, 4,530,976, 4,533,703, 4,533,704 and EP-A-0139513 describe similar high solids coating systems which are based, in part, upon urethane-modified polyester polyols and crosslinking agents therefor. The urethane-modified polyester polyols are produced by reacting a urethane-modified diol component (from a diol and diisocyanate) with a diacid component and a second polyol including at least 5 wt % triol.

In all of the aforementioned systems, molecular weight control of the polyesterurethane and urethane-modified polyester polyols is difficult because unwanted chain extension beyond the intended low molecular weight often results, leading to undesirably broad molecular weight distributions and high degrees of dispersion. The consequence, as indicated above for the acrylic and polyester based coatings, is that it is difficult to formulate high solids, high performance coating systems which possess both acceptable application viscosities and resulting film properties.

The problem of molecular weight control is somewhat alleviated by the process taught in U.S. Pat. No. 4,543,405. More particularly, this reference describes high performance, high solids coatings based upon low molecular weight polyurethane polyols and/or higher molecular weight prepolymers thereof, which polyurethane polyols are produced by reacting a polyisocyanate with a large excess of a polyol. After completion of the reaction, the excess polyol is removed, e.g., by distillation. Also relevant in this aspect is U.S. Pat. No. 4,288,577.

An obvious disadvantage of this procedure (and that of aforementioned U.S. Pat. Nos. 4,540,771 and 4,605,724) is that the distillation off of the excess polyol is inconvenient. Further, even at a high stoichiometric excess of the polyol reactant, unwanted chain extension beyond the intended low molecular weight may still occur.

It would, therefore, be advantageous to provide a polyol suitable for use in high performance, high solids coatings which not only possesses a desirable spectrum of molecular weight properties but also is quite convenient to prepare.

SUMMARY OF THE INVENTION

In accordance with the present invention, there is provided a particularly advantageous polyurethane polyol suitable for use in high solids coatings which, in its overall concept, is the reaction product of:

(A) from 0.8n to 1.2n moles of a diol component selected from substantially monomeric diols wherein the hydroxyl groups are separated by 3 carbon atoms or less, and (B) 1 mole of an isocyanate component selected from n-functional polyisocyanates.

wherein n is a number in the range of from 2 to 5.

It should be noted that, as used herein, the term "polyurethane polyol" refers to a reaction product wherein the reactants (diol component and polyisocyanate component) are linked substantially only via urethane linkage. This is in contrast, for example, to the aforementioned polyesterurethane and urethane-modified polyester polyols, in which the reactants are linked via urethane as well as ester linkages.

The polyurethane polyols in accordance with the present invention are produced by reacting (A) the diol component and (B) the isocyanate component, optionally in the presence of a polyurethane catalyst, and preferably at temperatures of about 125° C. or less. The use of the above components in the described ratios allows for exceptionally good molecular weight control, resulting in polyurethane polyols having a desirable spectrum of molecular weight properties.

The polyurethane polyols in accordance with the present invention are particularly suitable for use in formulating high solids clear and pigmented coatings having non-volatiles contents generally ranging from about 40 wt % to about 80 wt %. Even at these high non-volatiles contents, the coatings possess relatively low viscosities generally ranging from about 25 cps to about 300 cps (at 20° C.).

Further, upon application and curing, the resulting coatings based upon these polyurethane polyols possess a number of desirable properties such as good UV durability, chemical and weathering resistance and other properties making them particularly suitable for use, for example, in automotive, general industrial, plastics and decorative coatings applications.

These and other features and advantages of the present invention will be more readily understood by one skilled in the art from a reading of the following detailed description.

DETAILED DESCRIPTION OF THE PREFERRED EMBODIMENTS

As just mentioned, the polyurethane polyols in accordance with the present invention encompass, in general, the reaction product of (A) a particular diol component and (B) a particular isocyanate component, reacted in a specified ratio.

The isocyanate component is selected from n-functional isocyanates wherein n is a number ranging from 2 to 5, preferably from 2 to 4, and especially from 3 to 4. The isocyanate component may include a single such n-functional isocyanate or combinations thereof.

As specific examples of suitable n-functional isocyanates may be mentioned, for example, diisocyanates such as 1,6-hexane diisocyanate (commerically available, for example, under the trade designation HMDI from Mobay Chemical), isophorone diisocyanate (commercially available, for example, under the trade designation IPDI from Huels America Inc.), tetramethylxylene diisocyanate (commercially available, for example, under the trade designation m-TMXDI from American Cyanamid Co.), 2-methyl-1,5-pentane diisocyanate, 2,2,4-trimethyl-1,6-hexane diisocyanate, 1,12-dodecane diisocyanate and methylene bis(4-cyclohexyl isocyanate) (commercially available, for example, under the trade designation Desmodur W from Mobay Chemical); and higher functional isocyanates such as a biuret of 1,6-hexane diisocyanate (commercially available, for example, under the trade designation Desmodur N from Mobay Chemical), an isocyanurate of 1,6-hexane diisocyanate (commercially available, for example, under the trade designation Desmodur N-3390 from Mobay Chemical), an isocyanurate of isophorone diisocyanate (commercially available, for example, under the trade designation Desmodur Z-4370 from Mobay Chemical), a reaction product of tetramethylxylene diisocyanate and trimethylol propane (commercially available, for example, under the trade designation Cythane 3160 from American Cyanamid), and a reaction product of one mole of trimethylol propane and 3 moles of toluene diisocyanate (commercially available, for example, under the trade designation Mondur CB from Bayer).

Particularly preferred for use with the present invention are the biurets and/or isocyanurates of monomeric diisocyanates, especially 1,6-hexane diisocyanate. Isocyanurates are typically obtained by the cyclotrimerization of three moles of the diisocyanate, while biurets are typically obtained by the reaction of three moles of the diisocyanante with one mole of water. Also particularly preferred are the reaction products of monomeric diisocyantes with multi-functional alcohols having from 2 to 4 hydroxyl groups, and wherein the ratio of hydroxyl groups to isocyanate groups is from about 0.45 to about 0.55.

As also indicated above, the diol component is selected from substantially monomeric diols wherein the hydroxyl groups are separated by 3 carbon atoms or less. The diol component may comprise a single such monomeric diol or combinations thereof.

For the purposes of the present description, this class of diols can be divided into two groups: (i) symmetric diols—possessing hydroxyl groups of the same order, for example, two primary or two secondary hydroxyl groups; and (ii) asymmetric diols—possessing hydroxyl groups of a different order, for example, one primary and one secondary hydroxyl groups.

As preferred symmetric diols may be mentioned those having from 2 to 18 more preferably 3–18 carbon atoms, and especially 3–10 carbon atoms. As specific examples may be mentioned ethylene glycol, neopentyl glycol, 2,3-butane diol, 2,4-pentane diol, 1,3-propane diol and 2-ethyl-2-butyl-1,3-propane diol. Preferred of these are neopentyl glycol, 2,3-butane diol and 2-ethyl-2-butyl-1,3-propane diol.

As preferred asymmetric diols may be mentioned those having from 3.18, more preferably 4.18, and especially 4.10 carbon atoms As specific examples of suitable asymmetric diols may be mentioned 2-ethyl 1,3-hexane diol 1,2-propane diol, 1,3-butane diol. 1,2-hexane diol 1,2-octane diol 1,2-decane 2,2,4-trimethyl 1,3- pentane diol. Preferred of these are 2-ethyl-1,3-hexane diol. 1,2-hexane diol, 1,2-octane diole, 1,2-decane diol and 2,2,4-trimethyl-1,3 pentane diol The polyurethane polyols in accordance with the present invention are produced by reacting the diol component with the isocyanate component in specified ratios and optionally in the presence of a polyurethane catalyst.

The relative amounts of diol and isocyanate components, of course, depend upon the functionality of the isocyanate component. The components should be reacted in an amount such that the ratio of the number of moles of the diol component to the number of isocyanate equivalents is in the range of from 0.8 to 1.2. preferably from 0.9 to 1.1. more preferably from 0.95 to 1.05, still more preferably from 0.98 to 1.02, and especially 1 (stoichiometric). Stated another way, for every 1 mole of the n-functional isocyanate, there should be reacted from 0.8n to 1.2n. preferably from 0.9n to 1. In more preferably from 0.95n to 1.05n. still more preferably from 0.98n to 1.02n. and especially n moles of the diol component.

It is preferred that the components should be reacted at a temperature of about 125° C. or less. preferably ranging from about 15° C. to about 125° C. If the reaction temperature is too high, the molecular weight properties of the resulting polyurethane polyols may be undesirably compromised.

As mentioned above, the components may optionally be reacted in the presence of a polyurethane catalyst. Suitable polyurethane catalyst are conventional and may be utilized in conventional amounts. Of course, the particular choice of catalyst type and amount will be dictated based upon a number of factors such as the particular components and reaction conditions. These and other factors are well-known to those skilled in the art, who can make the proper choices accordingly.

The so-produced polyurethane polyols in accordance with the present invention should comprise an Mn ranging from about 600 to about 3000. preferably of about 2500 or less and greater than about 1000. and a degree of dispersion (Mw/Mn) ranging from about 1.1 to about 3.5. preferably less than about 2.5. and especially less than about 2.0.

Coating compositions may be formulated from these polyurethane polyols and suitable crosslinking agents. As suitable crosslinking agents may generally be mentioned any one of a number of well-known hydroxyl group-reactive crosslinking agents, such as polyisocyantes, blocked polyisocyanates and/or aminoplast resins.

Generally speaking, the aminoplast crosslinking agents are aldehyde condensation products of melamine, urea, benzoguanamine or similar known compounds. The most commonly used aldehyde is formaldehyde, These condensation products contain methylol or similar alkylol groups, which are commonly etherified with an alcohol having from 1 to 4 carbon atoms, such as methanol or butanol. The aminoplast resin can be substantially monomeric or polymeric depending upon the desired end properties of the coating. For example, monomeric melamine resins are preferred because they allow coatings with higher solids contents, while polymeric melamines are useful in coatings where the use of a strong acid catalyst should be avoided.

As suitable specific examples of aminoplast crosslinkers of the type described above may be mentioned hexamethoxymethyl melamine (commercially available, for example, under the trade designation Cymel 303 from American Cyanamid): mixed ether methoxy/butoxy methylmelamines (commercially available, for example, under the trade designation Cymel 1135 from American Cyanamid), polymeric butoxy methylmelamine (commercially available, for example, under the trade designation M-281-M from Cook Paint and Varnish) and high imino polymeric methoxymethyl melamines (commercially available, for example, under the trade designation Cymel 325 from American Cyanamid). This list could include various other well-known crosslinkers which differ, for example, by degree of polymerization, imino content, free methylol content and ratios of alcohol used for etherification.

These aminoplast crosslinking agents may be utilized in widely varying weight ratios of polyurethane polyol to aminoplast, generally ranging from about 90:10 to 40:60, preferably from about 90:10 to 50:50.

As suitable isocyanate crosslinking agents may be mentioned any of a number of those known for use in similar systems. As specific examples may be mentioned the previously described n-functional isocyanates, especially the biuret and isocyanate versions. Blocking of such isocyanates is well-known to those skilled in the art and need not be detailed here.

As with the aminoplast crosslinking agents, the isocyanate crosslinking agents may also be utilized in widely varying amounts, but generally in an equivalents ratio of hydroxyl to isocyanate groups ranging from about 0.7 to about 2.2.

The coating compositions may also contain a catalyst for the curing reaction, such as well-known acid catalysts and blocked derivatives thereof. Generally, these catalysts are utilized in amounts ranging from about 0.1% to about 5% by weight based upon the weight of the non-volatiles in the coating.

As specific examples of suitable acid catalysts may be mentioned phosphoric acid; alkyl acid phosphates such as phenyl acid phosphate; sulfonic acid and substituted sulfonic acids, such as p-toluene sulfonic acid (commercially available, for example, under the trade designation Cycat 4040 from American Cyanamid), amine blocked p-toluene sulfonic acid (commercially available, for example, under the trade designation VP-451 from Byk-Mallinckrodt), dodcylbenzene sulfonic acid (commercially available, for example, under the trade designation Bio-Soft S-100 from Stephan), amine blocked dodecylbenzene sulfonic acid (commercially available, for example, under the trade designations Nacure 5226 and Nacure XP-158 from King Industries) and dinonylnaphthalene disulfonic acid, and maleic acid and alkyl acid maleates.

Depending upon the field of application, the coating compositions may also contain a variety of other additives common to the paint industry such as solvents, pigments, coloring agents, pigment dispersing agents, light stabilizers, and thixotropic and other rheological agents, Especially for pigmented systems, the coating compositions will normally be formulated to contain additives for flow, surface tension adjustment, pigment wetting and/or solvent popping. As examples of typical additives may be mentioned flow aids (commercially available, for example, under the trade designation A-620-A2 polybutylacrylate from Cook Paint and Varnish, and BYK-320 silicone from BYK-Mallinckrodt); pigment wetting aids (commerically available, for example, under the trade designation Disperbyk from BYK-Mallinckrodt): UV absorbers (commercially available, for example, under the trade designation Tinuvin 900 form Ciba-Geigy); and amine light stabilizers (commercially available, for example, under the trade designation Tinuvin 292 from Ciba-Geigy).

The use of the above-described polyurethane polyols allows formulation of high solids coatings, possessing a non-volatiles content ranging from about 40 wt % to about 80 wt %, at low solution viscosities ranging from about 25 cps to about 300 cps, preferably ranging from about 50 cps to about 200 cps. at 20° C.

These coating compositions may be applied onto any number of well-known substrates by any one of a number of conventional application methods. Curing of the coatings may be conducted under a variety of conditions, although curing of the above-described one-pack systems is preferably carried out under baking conditions typically from about 80° C. to about 200° C.

The foregoing more general discussion of the present invention will be further illustrated by the following specific examples.

EXAMPLES

Example 1

Into a 2 liter, 3 neck round bottom flask equipped with a stirrer, condenser, heating mantle, thermometer, dropping funnel and nitrogen inlet were charged the following:
  438 g of 2-ethyl-1.3-hexane diol.
  188 g of butyl acetate and
  0.1 g of dibutyltin dilaurate.
and the mixture heated to 60° C. under a nitrogen blanket.

When the temperature had reached 60° C. the heating mantle was removed and the following mixture added over a 30 minute period:
  648 g of the isocyanurate of hexamethylene diisocyanate (equivalent weight at 90% NV =216) (commercially available under the trade designation Desmodur N-3390 from Mobay Chemical) and
  185 g of butyl acetate.

During addition of this mixture, the reaction temperature was kept below 70° C. After completion of the addition, the reaction temperature was held at 70° C. for 6 hours, at which point it was determined (by Fourier Transform Infared Spectroscopy—FTIR) that no residual isocyanate remained.

The resulting solution of polyurethane polyol A was a water white resin solution having a non-volatiles content of 63.9% and a Brookfield viscosity of 1100 cps.

The molecular weight properties of the polyurethane polyol were measured using a Waters Associates (Milford. Mass.) Model 840 Gel Permeation Chromatograph (GPC). The GPC was equipped with three 7.8mm ID×30cm ultrastyragel columns with linear. 100 and 500 angstrom pore sizes. A differential refractometer was used as a detector, and all samples were run using tetrahydrofuran (THF) as eluent with a flow rate of 1.0 ml/min.

Tp determine the molecular weights, a calibration curve was constructed using a combination of polystyrene (PS) standards covering a high molecular weight range and polyethylene glycol (PEG) standards covering a low molecular weight range )obtained commercially from American Polymer Standards Corp., Mentor, Ohio). The peak molecular weights (Mp) of the PS standards were 2070, 4000, 5450, 8500, 9300, 14000, 20600, 30800, 49000, 110000, 240000 and 390000. The peak molecular weights of the PEG standards were 62, 106, 238, 330, 425, 610, 1050 and 1500.

To obtain the calibration curve, standard solutions were prepared from 0.1 g of a standard diluted to a total volume of 25ml with THF. A calibration standard could contain up to four individual standards so long as each standard differed in Mp from all other standard in the solution by a 10-fold factor. The calibration standards were filtered through a 45 micron filter (commerically obtained from Phenomenex Inc., Torrence. Calif.). the 100 microliters of the solution was injected onto the columns and a chromatogram obtained. A calibration curve of elution time vs. log molecular weight using a narrow standard calibration and third order fit was obtained with the Waters Model 840 software, version 6.2.

The samples to be analyzed were prepared by placing 0.1 g of the sample in a 25 ml volumetric flask and diluting with THF. After filtration through the 45 micron filter, 100 microliters was injected onto the columns and a chromatogram obtained. The Mw, Mn and Mw/Mn were obtained relative to the above-described calibration curve using the Waters Model 840 software.

The polyurethane polyol had an Mn of 1760, Mw of 2994 and degree of dispersion of 1.70.

EXAMPLES 2-5

Polyurethane polyols were produced in a similar manner to that set forth in Example 1 from the components as set forth below in Table I.

TABLE I

| Reactants | Polyurethane Polyol | | | |
|---|---|---|---|---|
| | E2 (grams) | E3 (грамs) | E4 (grams) | E5 (grams) |
| 2-ethyl-1,3-hexane diol | 876.0 | 876.0 | 499.4 | 930.0 |
| Methyl propyl ketone | 415.0 | 150.0 | 187.4 | 110.0 |
| Dibutyltin dilaurate | 0.2 | 0.2 | 0.1 | 0.2 |
| Isocyanate 1[1] | 786.0 | | | |
| Isocyanate 2[2] | | 1164.0 | | |
| Isocyanate 3[3] | | | 624.9 | |
| Isocyanate 4[4] | | | | 1624.0 |
| Methyl propyl ketone | | 360.0 | 187.4 | 200.0 |

[1]Methylene-bis(cyclohexyl isocyanate) commercially available under the trade designation Desmodur W from Mobay Chemical.
[2]Isocyanurate of 1,6-hexane diisocyanate (eq. weight 181) commercially available under the trade designation Tolonate HDT from Rhone-Poulenc.
[3]Isocyanurate of 1,6-hexane diisocyanate (eq. weight 216 at 90% non-volatiles) commercially available under the trade designation Desmodur N-3300LV from Mobay Chemical.
[4]Biuret of 1,6-hexane diisocyanate commercially available under the trade designation Desmodur N-75 from Mobay Chemical.

The diol, methyl propyl ketone and dibutyltin dilaurate were charged to a 5 liter flask and the mixture heated to 60° C. The isocyanate and additional methyl propyl ketone were then added to the flask over a period of 1-2 hours. After the addition, the reaction mixture was held at approximately 70° C. until no isocyanate was detected by FTIR, generally from 0.5 to 2 hours.

The properties of the resulting polyurethane polyols and solutions are reported below in Table II.

TABLE II

| Property | Polyurethane Polyol | | | |
|---|---|---|---|---|
| | E2 | E3 | E4 | E5 |
| Solutions | | | | |
| Non-volatile % | 78.0 | 78.1 | 71.1 | 75.7 |
| Brookfield visc. (cps) | 4000 | 3500 | 1680 | 4000 |
| Polyols | | | | |
| OH number | 202 | 168 | 170 | 165 |

TABLE II-continued

| Property | Polyurethane Polyol | | | |
|---|---|---|---|---|
| | E2 | E3 | E4 | E5 |
| (mg KOH/g) | | | | |
| Mn | 687 | 1844 | 1613 | 2050 |
| Mw | 876 | 3594 | 2580 | 5020 |
| Degree of dispers. (Mw/Mn) | 1.28 | 1.95 | 1.60 | 2.45 |

Examples 6–9 and Comparative Examples 1–5

Polyurethane polyols were produced, in a similar manner to that set forth in Example 1, from the components as set forth below in Table III.

The diol, methyl amyl ketone and dibutyltin dilaurate (10% solution) were charged to 4 liter flask fitted with a mechanical stirrer, condenser, immersion thermometer and constant pressure addition funnel. and maintained under a nitrogen atmosphere. The mixture was heated to 70° C. and the isocyanate and additional methyl amyl ketone added over a period of two hours.

The reaction flask was cooled with an air stream as necessary to maintain the temperature. After a reaction period of about 90 minutes no isocyanate could be detected by FTIR.

For Example 6 and Comparative Example 1, during the course of the reaction the solutions gradually became more cloudy and finally opaque. Upon standing subsequent to the reaction, the solutions separated into a large opaque bottom layer (polymer plus a portion of the solvent) and a small clear top layer (solvent). The bottom layer was completely soluble in tetrahydrofuran.

The properties of the resulting polyurethane polyols and solutions are reported in Table IV.

Only a limited number of preferred embodiments of the present invention have been described above. One skilled in the art, however, will recognize numerous substitutions, modifications and alterations which can be made without departing from the spirit and scope of the invention as limited by the following claims.

We claim:

1. A polyurethane polyol which is the reaction product of:
   (a) from 0.8 n to 1.2 n moles of a diol component selected from substantially monomeric diols wherein the hydroxyl groups are separated by 3 carbon atoms or less, and
   (b) 1 mole of an isocyanate component selected from n-functional polyisocyanates,
wherein n is a number in the range of from 3 to 5 and said diol and isocyanate components are linked substantially only via urethane linkages.

2. The polyurethane polyol of claim 1, which is the reaction product of:
   (A) from 0.9n to 1.1n moles of the diol component and
   (B) 1 mole of the isocyanate component.

3. The polyurethane polyol of claim 2, which is the reaction product of:
   (A) from 0.95n to 1.05n moles of the diol component and
   (B) 1 mole of the isocyanate component.

4. The polyurethane polyol of claim 1, which is the reaction product of:
   (A) from 0.98n to 1.02n moles of the diol component and
   (B) 1 mole of the isocyanate component.

5. The polyurethane polyol of claim 1, wherein n is a number in the range of from 3 to 4.

TABLE III

| Reactants | Polyurethane Polyol | | | | | | | | |
|---|---|---|---|---|---|---|---|---|---|
| | E6 (grams) | E7 (grams) | E8 (grams) | E9 (grams) | CE1 (grams) | CE2 (grams) | CE3 (grams) | CE4 (grams) | CE5 (grams) |
| Ethylene glycol | 142.0 | | | | | | | | |
| 2,3-butane diol | | 208.28 | | | | | | | |
| Neopentyl glycol | | | 238.22 | | | | | | |
| 2-ethyl-2-butyl-1,3-propane diol | | | | 360.0 | | | | | |
| 1,4-butane diol | | | | | 206.02 | | | | |
| 2,5-hexane diol | | | | | | 270.51 | | | |
| 1,5-pentane diol | | | | | | | 238.4 | | |
| 1,6-hexane diol | | | | | | | | 270.0 | |
| 1,10-decane diol | | | | | | | | | 398.0 |
| Methyl amyl ketone | 125.25 | 125.25 | 125.25 | 125.25 | 125.0 | 125.25 | 125.25 | 125.0 | 125.25 |
| Dibutyltin dilaurate | 0.7 | 0.7 | 0.7 | 0.7 | 0.7 | 0.7 | 0.7 | 0.7 | 0.7 |
| Isocyanate 2 | 414.0 | 414.0 | 414.0 | 414.0 | 414.0 | 414.0 | 414.0 | 414.0 | 414.0 |
| Methyl amyl ketone | 125.25 | 125.25 | 125.25 | 125.25 | 125.0 | 125.25 | 125.25 | 125.0 | 125.25 |

TABLE IV

| Property | Polyurethane Polyol | | | | | | | | |
|---|---|---|---|---|---|---|---|---|---|
| | E6 | E7 | E8 | E9 | CE1 | CE2 | CE3 | CE4 | CE5 |
| Solutions | | | | | | | | | |
| Non-volatile %[4] | Precip. from Solut. | 72.6 | 77.5 | 75.6 | Precip. from Solut. | Gelled | Gelled | Gelled | Gelled |
| Brookfield visc. (cps)[5] | | 6872 | 3900 | 5500 | | | | | |
| Polyols | | | | | | | | | |
| OH number (mg/KOH/g)[6] | 231 | 207 | 197 | 163 | 207 | | | | |
| Mn | 1598 | 1213 | 1484 | 1732 | 3446 | | | | |
| Mw | 3148 | 1504 | 2152 | 2459 | 25879 | | | | |
| Degree of dispers. (Mw/Mn) | 1.97 | 1.24 | 1.45 | 1.42 | 7.51 | | | | |

[4] determined after heating for 1 hour at 100° C.
[5] determined at ambient temperature (= 20° C.) with a #4 spindle at 10 rpm.
[6] based upon non-volatile %.

6. The polyurethane polyol of claim 5, wherein the n-functional polyisocyanate is selected from an isocyanurate of a monomeric diisocyanate a biuret of a monomeric diisocyanate and the reaction product of a monomeric diisocyanate with a multi-functional alcohol having 2 to 4 hydroxyl groups in a ratio of hydroxyl to isocyanate groups of from about 0.45 to 0.55.

7. The polyurethane polyol of claim 1, wherein the diol component is selected from substantially monomeric symmetric diols wherein the hydroxyl groups are separated by 3 carbon atoms or less.

8. The polyurethane pulyul of claim 7, wherein the symmetric diols are selected from ethylene glycol, neopentyl glycol. 2.3-butane diol. 2.4-pentane diol. 1,3-propane diol or 2-ethyl-2-butyl-1,3-propane diol.

9. The polyurethane polyol of claim 8, wherein the symmetric diols are selected from neopentyl glycol. 2,3-butane diol or 2-ethyl-2-butyl-1,3-propane diol.

10. The polyurethane polyol of claim 1, wherein the diol component is selected from substantially monomeric asymmetric diols wherein the hydroxyl groups are separated by 3 carbon atoms or less.

11. The polyurethane polyol of claim 10, wherein the asymmetric diols are selected from 2-ethyl-1,3-hexane diol 1,2-propane diol. 1,3-butane diol, 1,2-hexane diol, 1,2-octane diol, 1,2-decane diol or 2,2,4-trimethyl-1,3-pentane diol.

12. The polyurethane polyol of claim 11, wherein the asymmetric diols are selected from 2-ethyl-1,3-hexane diol 1,2-hexane diol. 1,2-octane diol, 1,2-decane diol or 2,2,4-trimethyl 1,3-pentane diol.

13. The polyurethane polyol of claim 1, possessing a number average molecular weight in the range of from about 600 to about 3000.

14. The polyurethane polyol of claim 13, possessing a number average molecular weight of about 2500 or less.

15. The polyurethane polyol of claim 13, possessing a number average molecular weight of greater than about 1000.

16. The polyurethane polyol of claim 1, possessing a degree of dispersion in the range of from about 1.1 to about 3.5.

17. The polyurethane polyol of claim 16, possessing a degree of dispersion of about 2.5 or less.

18. The polyurethane polyol of claim 17, possessing a degree of dispersion of about 2.0 or less.

19. A method of producing a polyurethane polyol by reacting
  (a) from 0.8 n to 1.2 n moles of a diol component selected from substantially monomeric diols wherein the hydroxyl groups are separated by 3 carbon atoms or less, and
  (b) 1 mole of an ioscyanate component selected from n-functional polyisocyanates,
wherein n is a number in the range of from 2 to 5, at a temperature of about 125° C. or less, to link said diol and isocyanate components substantially only via urethane linkages.

20. The method of claim 19, wherein (A) from 0.9 n to 1.1 n moles of the diol component are reacted with (B) 1 mole of the isocyanate component.

21. The method of claim 20, wherein (A) from 0.95n to 1.05n moles of the diol component are reacted with (B) 1 mole of the isocyanate component.

22. The method of claim 21, wherein (A) from 0.98n to 1.02n moles of the diol component are reacted with (B) 1 mole of the isocyanate component.

23. The method of claim 19, wherein n is a number in the range of from 3 to 4.

24. The method of claim 23, wherein the n-functional polyisocyanate is selected from an isocyanurate of a monomeric diisocyanate. a biuret of a monomeric diisocyanate, or the reaction product of a monomeric diisocyanate with a multi-functional alcohol having 2 to 4 hydroxyl groups in a ratio of hydroxyl to isocyanatc groups of from about 0.45 to 0.55.

25. The method of claim 19, wherein the diol component is selected from substantially monomeric symmetric diols wherein the hydroxyl groups are separated by 3 carbon atoms or less.

26. The method of claim 25, wherein the symmetric diols are selected from ethylene glycol, neopentyl glycol. 2.3-butane diol. 2,4-pentane diol, 1,3-propane diol or 2-ethyl-2-butyl-1,3-propane diol.

27. The method of claim 26, wherein the symmetric diols are selected from neopentyl glycol, 2,3-butane diol or 2-ethyl-2-butyl-1,3-propane diol.

28. The method of claim 19, wherein the diol component is selected from substantially monomeric asymmetric diols wherein the hydroxyl groups are separated by 3 carbon atoms or less.

29. The method of claim 28, wherein the asymmetric diols are selected from 2-ethyl-1,3-hexane diol, 1,2-propane diol, 1,3-butane diol, 1,2-hexane diol, 1,2-octane diol, 1,2-decane diol or 2,2,4-trimethyl-1,3pentane diol.

30. The method of claim 29, wherein the asymmetric diols are selected from 2-ethyl-1,3-hexane diol, 1,2-hexane diol, 1,2-octane diol, 1,2-decane diol or 2,2,4-trimethyl-1,3-pentane diol.

31. A coating composition comprising:
  (1) a polyurethane polyol which is the reaction product of (A) from 0.8 n to 1.2 n moles of a diol component selected from substantially monomeric diols wherein the hydroxyl groups are separated by 3 carbon atoms or less, and (B) 1 mole of an isocyanate component selected from n-functional polyisocyanates wherein n is a number in the range of from 3 to 5, said diol and said isocyanate components being linked substantially only via urethane linkages; and
  (2) an hydroxyl groups-reactive crosslinking agent.

32. The coating composition of claim 31 possessing a non-volatiles content ranging from about 40 wt % to about 80 wt % at a solution viscosity ranging from about 25 cps to about 300 cps at 20° C.

33. The coating composition of claim 32, possessing a non-volatiles content ranging from about 40 wt % to about 80 wt % at a solution viscosity ranging from about 50 cps to about 200 cps at 20° C.

34. The coating composition of claim 31, wherein the polyurethane polyol is the reaction product of (A) from 0.9 n to 1.1 n moles of the diol component, and (B) 1 mole of the isocyanate component.

35. The coating composition of claim 34, wherein the polyurethane polyol is the reaction product of (A) from 0.95n to 1.05n moles of the diol component, and (B) 1 mole of the isocyanate component.

36. The coating composition of claim 35, wherein the polyurethane polyol is the reaction product of (A) from 0.98n to 1.02n moles of the diol component, and (B) 1 mole of the isocyanate component.

37. The coating composition of claim 36, wherein n is a number in the range of from 3 to 4.

38. The coating composition of claim 37, wherein the polyisocyanate component of the polyurethane polyol is selected from an isocyanurate of a monomeric diisocyanate, a biuret of a monomeric diisocyanate, or the reaction product of a monomeric diisocyanate with a multi-functional alcohol having 2 to 4 hydroxyl groups in a ratio of hydroxyl to isocyanate groups of from about 0.45 to 0.55.

39. The coating composition of claim 31, wherein the polyurethane polyol possesses a number average molecular weight in the range of from about 600 to about 3000.

40. The coating composition of claim 39, wherein the polyurethane polyol possesses a number average molecular weight of about 2500 or less.

41. The coating composition of claim 39, wherein the polyurethane polyol possesses a number average molecular weight of greater than about 1000.

42. The coating composition of claim 31, wherein the polyurethane polyol possesses a degree of dispersion in the range of from about 1.1 to about 3.5.

43. The coating composition of claim 42, wherein the polyurethane polyol possesses a degree of dispersion of about 2.5 or less.

44. The coating composition of claim 43, wherein the polyurethane polyol possesses a degree of dispersion of about 2.0 or less.

45. The coating composition of claim 31, wherein the hydroxyl groups-reactive crosslinking agent is selected from a polyisocyanate. blocked polyisocyanate or an aminoplast resin.

46. The coating composition of claim 31, wherein the hydroxyl groups-reactive crosslinking agent comprises an aminoplast resin.

47. The coating composition of claim 46, wherein the hydroxyl groups-reactive crosslinking agent comprises an aminoplast resin in a weight ratio of polyurethane polyol to aminoplast resin in the range of from about 90:10 to 50:50.

48. The coating composition of claim 46, wherein the aminoplast resin comprises an hexamethoxymethyl melamine etherified with an alcohol having from 1 to 4 carbon atoms.

49. A polyurethane polyol which is the reaction product formed by contacting
(A) from 0.98 to 1.02 n moles of a diol component selected from substantially monomeric diols wherein the hydroxyl groups are separated by 2 or 3 carbon atoms, and
(B) 1 mole of an isocyanate component selected from n-functional polyisocyanates,
wherein n is a number in the range of from about 3 to about 5 and said diol and isocyanate components are linked substantially only via urethane linkages.

50. The polyurethane polyol of claim 49 which possesses a number average molecular weight in the range of from about greater than 1000 to about 3000.

51. The method of claim 19, wherein a polyurethane catalyst is used in reacting said diol and isocyanate components.

52. The method of claim 19, wherein a solvent is employed in reacting said diol and isocyanate components.

53. The method of claim 19, wherein said solvent is selected from the group consisting of alkyl and alkenyl esters and ketones.

54. The coating composition of claim 31, further comprising a curing catalyst.

55. The coating composition of claim 31, wherein n is a number in the range of from 3 to 5.

56. A coating composition comprising:
(1) a polyurethane polyol which is the reaction product of (A) from 2.4 to 3.6 moles of 2-ethyl-1,3-hexanediol and (B) a trifunctional polyisocyanate comprising an isocyanurate of 1,6-hexanediisocyanate; and
(2) an hydroxyl groups-reactive crosslinking agent comprising hexamethoxymethylmelamine.

57. The polyurethane polyol of claim 1 wherein said diol contains from 3 to about 18 total carbon atoms.

58. The method of claim 19 wherein said diol contains from 3 to about 18 total carbon atoms.

59. The coating composition of claim 31 wherein said diol contains from 3 to about 18 total carbon atoms.

* * * * *